(12) United States Patent  
Walsh

(10) Patent No.: US 7,561,590 B1  
(45) Date of Patent: Jul. 14, 2009

(54) NETWORK SWITCH HAVING VIRTUAL INPUT QUEUES FOR FLOW CONTROL

(75) Inventor: Hugh Walsh, Los Gatos, CA (US)

(73) Assignee: Marvell International Ltd., Hamilton (BM)

(*) Notice: Subject to any disclaimer, the term of this patent is extended or adjusted under 35 U.S.C. 154(b) by 779 days.

(21) Appl. No.: 10/670,022

(22) Filed: Sep. 23, 2003

Related U.S. Application Data

(60) Provisional application No. 60/647,873, filed on May 5, 2003.

(51) Int. Cl.
*H04L 12/56* (2006.01)

(52) U.S. Cl. .................................. 370/416; 370/423

(58) Field of Classification Search .............. 370/371, 370/374, 378, 381, 412–422
See application file for complete search history.

(56) References Cited

U.S. PATENT DOCUMENTS

| | | | | |
|---|---|---|---|---|
| 5,001,706 | A | * | 3/1991 | Dighe et al. ................ 370/422 |
| 5,852,630 | A | * | 12/1998 | Langberg et al. ............. 375/219 |
| 6,091,728 | A | * | 7/2000 | Lazraq et al. ............. 370/395.7 |
| 6,115,356 | A | | 9/2000 | Kalkunte et al. |
| 6,167,054 | A | | 12/2000 | Simmons et al. |
| 6,192,028 | B1 | | 2/2001 | Simmons et al. |
| 6,192,422 | B1 | | 2/2001 | Daines et al. |
| 6,246,690 | B1 | | 6/2001 | DiPlacido et al. |
| 6,252,849 | B1 | | 6/2001 | Rom et al. |
| 6,405,258 | B1 | | 6/2002 | Erimli et al. |
| 6,456,590 | B1 | * | 9/2002 | Ren et al. ................... 370/229 |
| 6,501,732 | B1 | | 12/2002 | Xu et al. |
| 6,570,850 | B1 | | 5/2003 | Gutierrez et al. |
| 6,647,019 | B1 | * | 11/2003 | McKeown et al. ......... 370/422 |

| | | |
|---|---|---|
| 2002/0191542 | A1 | 12/2002 Gerard Pauwels et al. |
| 2004/0076194 | A1* | 4/2004 Okamoto et al. ............. 370/537 |

FOREIGN PATENT DOCUMENTS

WO    WO 03/017702 A1    2/2003

OTHER PUBLICATIONS

U.S. Appl. No. 10/071,417, Pannell et al.
U.S. Appl. No. 10/150,147, Walsh et al.
U.S. Appl. No. 10/141,096, Walsh et al.
Seifert, "The Switch Book: The Complete Guide to LAN Switch Technology," 2000, pp. 640-641, John Wiley & Sons, US.
Noureddine et al., "Selective Back-Pressure in Switched Ethernet LANS," Proceedings of IEEE Globecom, Dec. 1999, pp. 1-9, IEEE, US.
Jain, "Myths About Congestion Management in High-Speed Networks," Internetworking: Research and Experience, 1992, pp. 101-113, vol. 29, Issue 2, US.

* cited by examiner

*Primary Examiner*—Hassan Kizou  
*Assistant Examiner*—Bo Hui A Zhu

(57) ABSTRACT

A network switching device for transferring data among n channels includes n receive circuits and n ingress modules. The receive circuits receive frames from n channels. The ingress modules include a memory circuit that stores each frame in buffers. The buffers store bytes of data. A destination resolution circuit selects a destination channel for each of the frames. A forwarding module enqueues each buffer to the respective destination channel. Egress modules transmit data in the buffers enqueued to the n channels. Each of the n counters stores a count for a respective n channel. The counters are incremented when a respective ingress module enqueues a buffer to a destination channel. The counters are decremented after the data stored in a buffer is transmitted to the n channels. The egress modules exercise flow control on a respective channel when a respective count is greater than a pause threshold.

52 Claims, 8 Drawing Sheets

US 7,561,590 B1

NETWORK SWITCH HAVING VIRTUAL INPUT QUEUES FOR FLOW CONTROL

CROSS-REFERENCE TO RELATED APPLICATIONS

This application claims the benefit of U.S. Provisional Patent Application Ser. No. 60/467,873 entitled "Virtual Input Queues," filed May 5, 2003, the disclosure thereof incorporated by reference herein in its entirety.

This application is related to U.S. Non-provisional patent application Ser. No. 10/071,417 entitled "Quality of Service Queuing System," filed Feb. 6, 2002, U.S. Non-provisional patent application Ser. No. 10/150,147 entitled "Apparatus and Method for Dynamically Limiting Output Queue Size in a Quality of Service Switch," filed May 17, 2002, and U.S. Non-provisional patent application Ser. No. 10/141,096 entitled "Method and Apparatus for Preventing Blocking in a Quality of Service Switch," filed May 7, 2002, the disclosures thereof incorporated by reference herein in their entirety.

BACKGROUND

The present invention relates generally to data communications, and particularly to network switch having virtual input queues.

The rapidly increasing popularity of networks such as the Internet has spurred the development of network services such as streaming audio and streaming video. These new services have different latency requirements than conventional network services such as electronic mail and file transfer. New quality of service (QoS) standards require that network devices, such as network switches, address these latency requirements. For example, the IEEE 802.1 standard divides network traffic into several classes of service based on sensitivity to transfer latency, and prioritizes these classes of service. The highest class of service is recommended for network control traffic, such as switch-to-switch configuration messages. The remaining classes are recommended for user traffic. The two highest user traffic classes of service are generally reserved for streaming audio and streaming video. Because the ear is more sensitive to missing data than the eye, the highest of the user traffic classes of service is used for streaming audio. The remaining lower classes of service are used for traffic that is less sensitive to transfer latency, such as electronic mail and file transfers.

FIG. 1 shows a simple network 100 in which a network switch 102 connects two devices 104A and 104B. Each of devices 104 can be any network device, such as a computer, a printer, another network switch, or the like. Switch 102 transfers data between devices 104 over channels 106A and 106B, and can also handle an arbitrary number of devices in addition to devices 104. Channels 106 can include fiber optic links, wireline links, wireless links, and the like.

FIG. 2 is a block diagram of a conventional shared-memory output-queue store-and-forward network switch 200 that can act as switch 102 in network 100 of FIG. 1. Switch 200 has a plurality of ports including ports 202A and 202N. Each port 202 is connected to a channel 204, a queue controller 206 and a memory 208. Each port 202 includes an ingress module 214 that is connected to a channel 204 by a physical layer (PHY) 210 and a media access controller (MAC) 212. Referring to FIG. 2, port 202A includes an ingress module 214A that is connected to channel 204A by a MAC 212A and a PHY 210A, while port 202N includes an ingress module 214N that is connected to channel 204N by a MAC 212N and a PHY 210N. Each port 202 also includes an egress module 216 that is connected to a channel 204 by a MAC 218 and a PHY 220. Referring to FIG. 2, port 202A includes an egress module 216A that is connected to channel 204A by a MAC 218A and a PHY 220A, while port 202N includes an egress module 216N that is connected to channel 204N by a MAC 218N and a PHY 220N.

FIG. 3 is a flowchart of a conventional process 300 performed by network switch 200. At power-on, queue controller 206 initializes a list of pointers to unused buffers in memory 208 (step 302). A port 202 of switch 200 receives a frame from a channel 204 (step 304). The frame enters the port 202 connected to the channel 204 and traverses the PHY 210 and MAC 212 of the port 202 to reach the ingress module 214 of the port 202. Ingress module 214 requests and receives one or more pointers from queue controller 206 (step 306). Ingress module 214 stores the frame at the buffers in memory 208 that are indicated by the received pointers (step 308).

Ingress module 214 then determines to which channel (or channels in the case of a multicast operation) the frame should be sent, according to methods well-known in the relevant arts (step 310). Queue controller 206 sends the selected pointers to the egress modules 216 of the ports connected to the selected channels (step 312). These egress modules 216 then retrieve the frame from the buffers indicated by the pointers (step 314) and send the frame to their respective channels 204 (step 316). These egress modules 216 then release the pointers for use by another incoming frame (step 318). The operation of switch 200 is termed "store-and-forward" because the frame is stored completely in the memory 208 before leaving the switch 200. The store-and-forward operation creates some latency. Because all of the switch ports 202 use the same memory 208, the architecture of switch 202 is termed "shared memory."

The queue controller 206 performs the switching operation by operating only on the pointers to memory 208. The queue controller 206 does not operate on the frames. If pointers to frames are sent to an egress module 216 faster than that egress module 216 can transmit the frames over its channel 204, the pointers are queued within that port's output queue 216. Because pointers accumulate only at the output side of switch 200, the architecture of switch 200 is also termed "output-queued." Thus switch 200 has a store-and-forward, shared-memory, output-queued architecture.

In an output-queued switch, the queue controller must enqueue a frame received on a port to all of the output queues selected for that frame before the next frame is completely received on that port. Thus at any time only one complete frame can be present at each input port, while the output queues can be arbitrarily large. Thus the latency of an output-queued switch has two components: ingress latency and egress latency. Ingress latency is the period between the reception of a complete frame at an ingress module and the enqueuing of the pointers to that frame at all of the output queues to which the frame is destined. Egress latency is the period between enqueuing of the pointers to a frame in an output queue of a port and the completion of the transmission of that frame from that port.

Of course, QoS is relevant only when the switch is congested. When the amount of data entering the switch exceeds the amount of data exiting the switch, the output queues fill with pointers to frames waiting to be transmitted. If congestion persists, the memory will eventually fill with frames that have not left the switch. When the memory is full, incoming frames are dropped. When memory is nearly full and free memory buffers are rare, QoS dictates the free buffers be allocated to frames having high classes of service. But when the switch is uncongested, free memory buffers are plentiful, and no preferential treatment of frames is necessary to achieve QoS.

QoS is implemented in an output-queued store-and-forward switch by controlling the overall latency for each frame such that frames having a high class of service experience less latency than frames having lower classes of service. Many conventional solutions exist to reduce egress latency. However, solutions for reducing ingress latency in an output-queued store-and-forward switch either do not exist, or have proven unsatisfactory.

Another feature desirable in network switches is flow control. This feature allows a switch to regulate the amount of inbound data by instructing link partners to cease and resume transmission of data to the network switch. One flow control technique is defined by the IEEE 802.3 standard, which was devised for input-queued switches. In input-queued switches, it is easy to determine which link partner is causing congestion in the switch by simply monitoring the input queue receiving data from that link partner. But in conventional output-queued switches, it is difficult to determine which link partner is causing congestion by monitoring the output queues because it is difficult or impossible to determine the link partner from which the frames in an output queue were received.

SUMMARY

In general, in one aspect, the invention features a network switching device for transferring data among n channels, the network switching device comprising n receive circuits each adapted to receive frames of the data from a respective one of the n channels, n ingress modules each comprising a frame data memory controller circuit adapted to store the data of each frame in one or more buffers, wherein each of the buffers is adapted to store a plurality of bytes of the data, and a destination resolution circuit adapted to select one or more of the n channels as destination channels for each of the frames; a forwarding module adapted to enqueue each buffer storing the data of the frames to the respective one or more destination channels; n egress modules each adapted to transmit, to a respective one of the n channels, the data in the buffers enqueued to the respective one of the n channels; and n counters each adapted to store a count for a respective one of the n channels, to increment the count when a respective one of the n ingress modules enqueues a buffer to one or more destination channels, and to decrement the count after the data stored in a buffer enqueued from the respective one of the n ingress modules is transmitted to one or more of the n channels to which the buffer was enqueued; wherein each of the n egress modules is further adapted to exercise flow control on a respective one of the n channels when a respective count is greater than a pause threshold.

Particular implementations can include one or more of the following features. To exercise flow control, each of the n egress modules is further adapted to transmit a pause frame to a respective one of the n channels. Each of the n egress modules is further adapted to terminate flow control on a respective one of the n channels when the respective count is less than a pause release threshold. To terminate flow control, each of the n egress modules is further adapted to transmit a pause release frame to a respective one of the n channels. To decrement the count, each of the n counters is further adapted to decrement the count after the data stored in a buffer enqueued from the respective one of the n ingress modules is transmitted to all of the n channels to which the buffer was enqueued. Implementations comprise n output queues each associated with one of the n channels and adapted to store pointers for one or more of the buffers; and wherein, to enqueue one of the buffers to one of the destination channels, the forwarding module is further adapted to send, to the one of the n output queues associated with the one of the destination channels, a pointer for the one of the buffers. Implementations comprise n reserve modules each adapted to reserve one or more of the buffers to each of the n channels; wherein the pause threshold for each of the n channels is a function of at least one of the group consisting of the number of the buffers reserved to the channel; and the number of the buffers neither reserved nor enqueued to any of the n channels. Implementations comprise n reserve modules each adapted to reserve one or more of the buffers to each of the n channels; wherein the pause release threshold for each of the n channels is a function of at least one of the group consisting of the number of the buffers reserved to the channel; and the number of the buffers neither reserved nor enqueued to any of the n channels. Implementations comprise an integrated circuit comprising the network switching device. Implementations comprise a network switch comprising the network switching device. Implementations comprise a memory comprising the buffers.

In general, in one aspect, the invention features a method, apparatus, and computer-readable media for transferring data among n channels, the method comprising receiving frames of the data from the n channels, storing the data of each frame in one or more buffers, selecting one or more of the n channels as destination channels for each of the frames, and enqueueing each buffer storing the data of the frames to the respective one or more destination channels; transmitting, to each of the n channels, the data stored in the buffers enqueued to the respective one of the n channels; storing a count for each of the n channels; incrementing the count for one of the n channels when enqueueing a buffer storing data for a frame received by the one of the n channels; decrementing the count for one of the n channels after the data stored in one of the buffers for one of the frames received from the one of the n channels is transmitted to one or more of the n channels to which the one of the buffers was enqueued; exercising flow control on one of the n channels when a respective count is greater than a pause threshold.

Particular implementations can include one or more of the following features. Exercising flow control on a respective one of the n channels comprises transmitting a pause frame to the respective one of the n channels. Implementations comprise terminating flow control on one of the n channels when a respective count is less than a pause release threshold. Terminating flow control on a respective one of the n channels comprises transmitting a pause release frame to the respective one of the n channels. Decrementing the count for one of the n channels comprises decrementing the count after the data stored in the one of the buffers for the one of the frames is transmitted to all of the n channels to which the one of the buffers was enqueued. Enqueuing one of the buffers to one of the destination channels comprises sending a pointer for the one of the buffers to an output queue associated with the one of the destination channels. Implementations comprise reserving one or more of the buffers to each of the n channels; wherein the pause threshold for each of the n channels is a function of at least one of the group consisting of the number of the buffers reserved to the channel; and the number of the buffers neither reserved nor enqueued to any of the n channels. Implementations comprise reserving one or more of the buffers to each of the n channels; wherein the pause release threshold for each of the n channels is a function of at least one of the group consisting of the number of the buffers reserved to the channel; and the number of the buffers neither reserved nor enqueued to any of the n channels.

The details of one or more implementations are set forth in the accompanying drawings and the description below. Other features will be apparent from the description and drawings, and from the claims.

Figure 1:
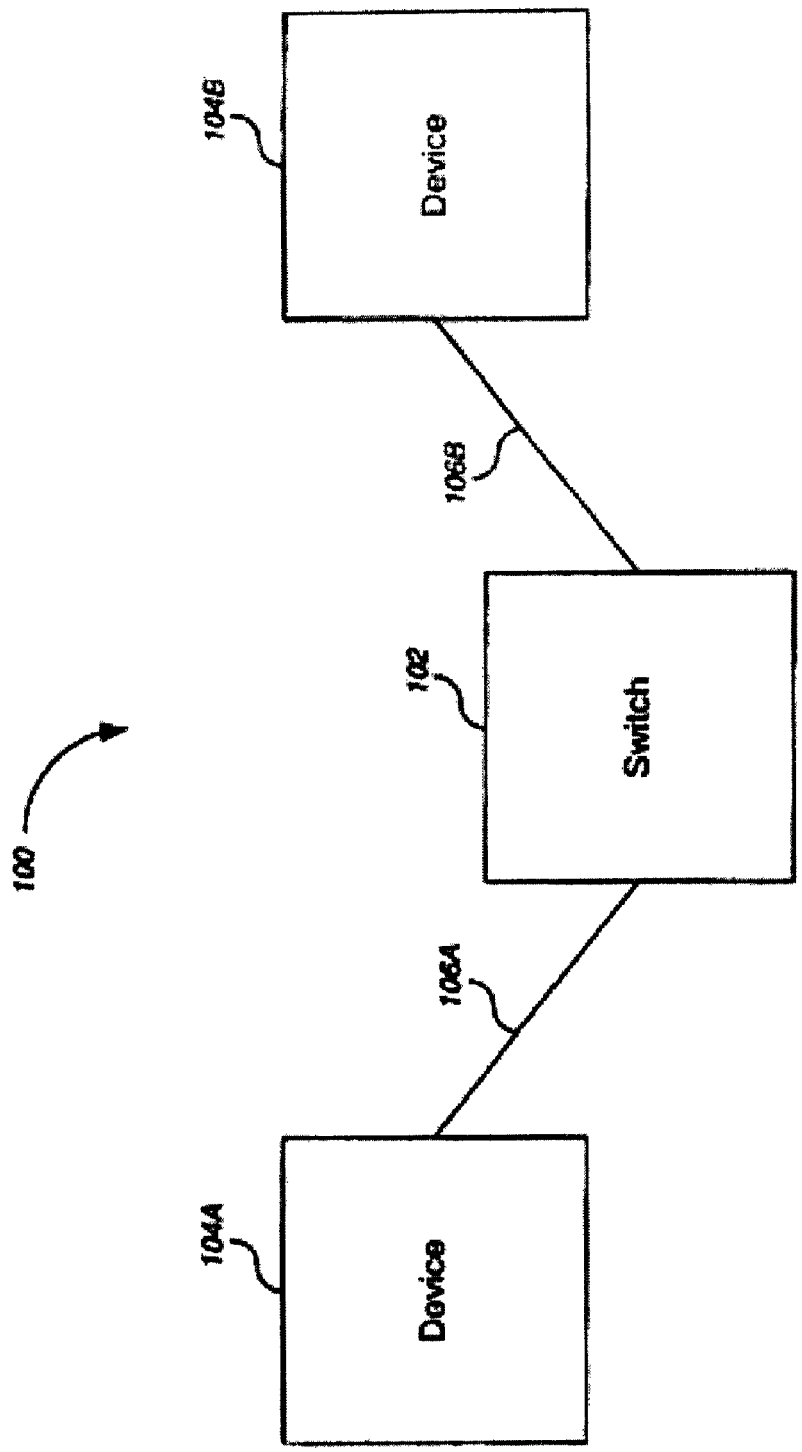
FIG. 1 shows a simple network in which a network switch connects two devices.

The leading digit(s) of each reference numeral used in this specification indicates the number of the drawing in which the reference numeral first appears.

DETAILED DESCRIPTION

Figure 2:
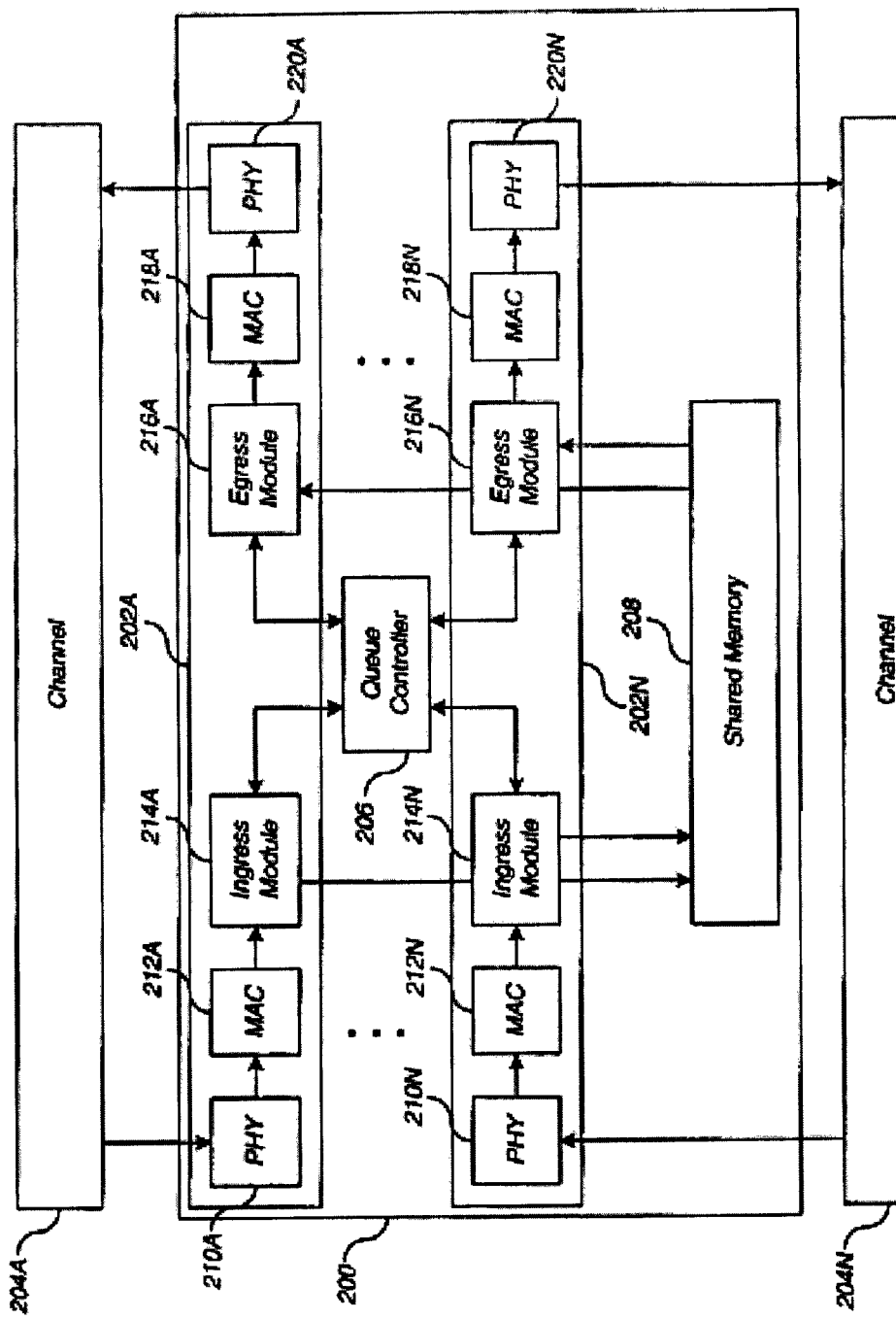
FIG. 2 is a block diagram of a conventional shared-memory output-queue store-and-forward network switch that can act as the switch in network of FIG. 1.
Figure 3:
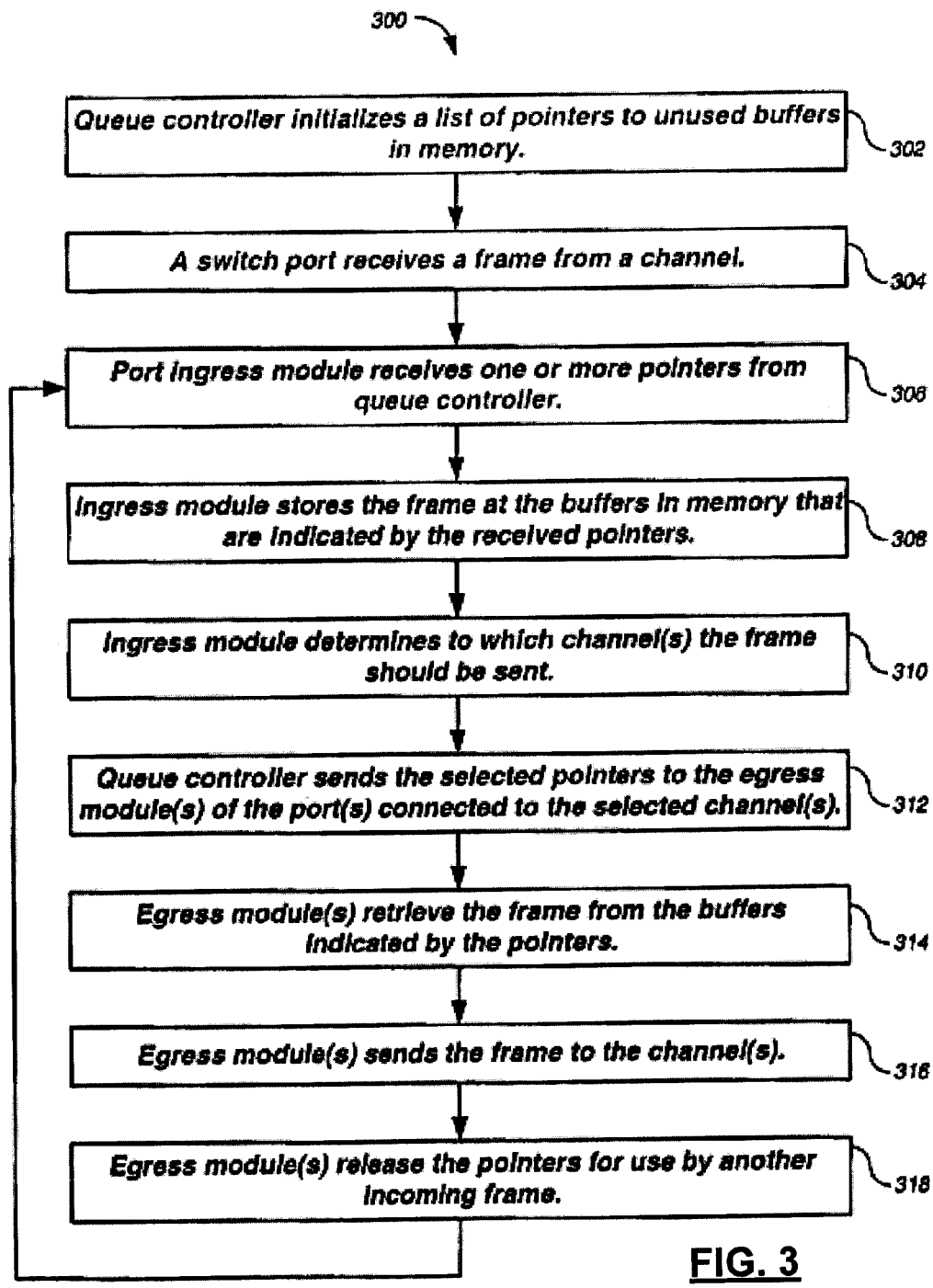
FIG. 3 is a flowchart of a conventional process performed by the network switch of FIG. 2.
Figure 4:
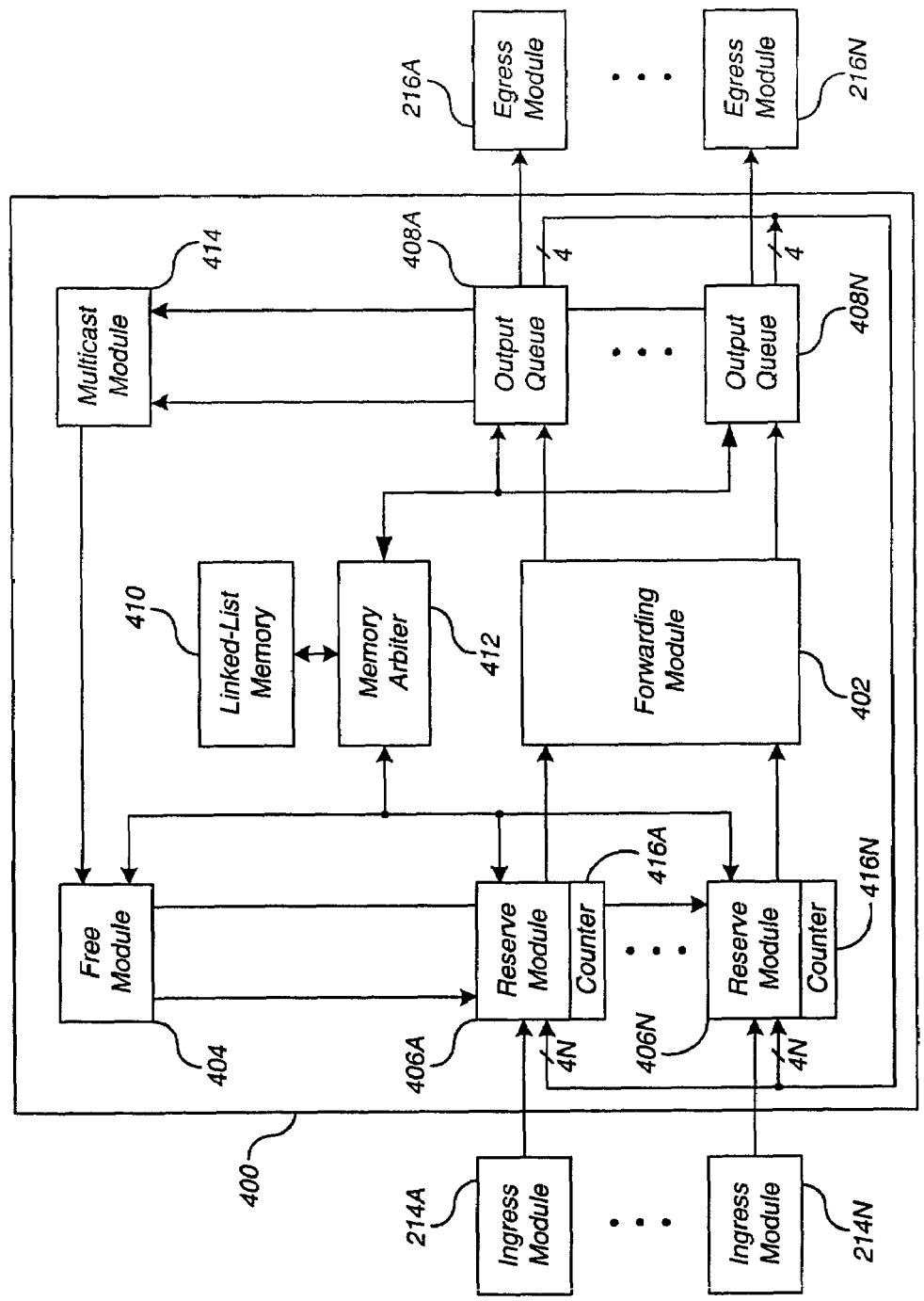
FIG. 4 is a block diagram of a queue controller suitable for use as the queue controller in the network switch of FIG. 2.

FIG. 4 is a block diagram of a queue controller 400 suitable for use as queue controller 206 in network switch 200 of FIG. 2. Queue controller 400 can be implemented using hardware, software, or any combination thereof. Queue controller 400 includes a forwarding module 402, a free module 404, a plurality of reserve modules 406A through 406N, a plurality of virtual queue counters 416A through 416N, and a plurality of output queues 408A through 408N. Each reserve module 406 and counter 416 are connected to one of ingress modules 214. Each output queue 408 is connected to one of egress modules 216.

Free module 404 and reserve modules 406 each contain one linked list of pointers to buffers in shared memory 208. Each output queue 408 contains a priority queue for each class of service implemented by switch 400. Each priority queue contains one linked list of pointers to buffers in shared memory 208. In one implementation, switch 400 implements four classes of service labeled class 0 through class 3, with class 3 having the highest priority. In this implementation, each output queue 408 contains four priority queues. Other implementations can implement fewer or greater classes of service, as will be apparent to one skilled in the relevant art after reading this description.

All of the linked lists for free module 404, reserve modules 406, and output queues 408 are stored in a linked-list memory 410. A memory arbiter 412 arbitrates among competing requests to read and write linked-list memory 410. Each of free module 404, reserve modules 406, and output queues 408 maintains an object that describes its linked list. Each of these objects maintains the size of the list and pointers to the head and tail of the list. Each of free module 404, reserve modules 406, and output queues 408 traverses its linked list by reading and writing the "next" links into and out of linked list memory 410.

Figure 5:
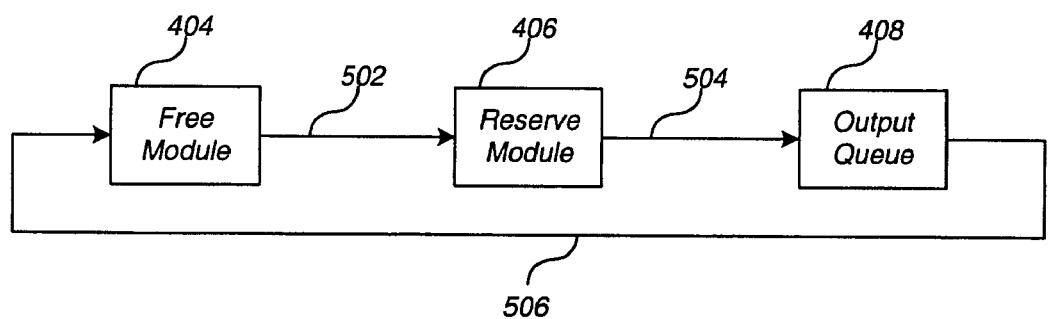
FIG. 5 depicts the manner in which these pointers circulate within the queue controller of FIG. 4.

Free module 404 contains pointers to buffers in memory 208 that are available to store newly-received frames (that is, the buffers have an available status). Each reserve module 406 contains a list of pointers to available buffers that are reserved for the port housing that reserve module. FIG. 5 depicts the manner in which these pointers circulate within queue controller 400. Queue controller 400 allocates pointers from free module 404 to reserve modules 406 according to the methods described below (flow 502). Buffers associated with pointers in a free module 404 have an available status until a frame is stored in the buffers. Storing a frame in one or more buffers changes the status of those buffers to unavailable. To forward a frame to an output port, the frame is stored in a buffer in memory 208, and the pointers to that buffer are transferred to the output queue 408 for that output port (flow 504). When a frame is sent from an output port to a channel 106, the pointers for that frame are returned to free module 404, thereby changing the status of the pointers to available (flow 506).

Multicast module 414 handles multicast operations. In linked-list memory 410, pointers associated with the start of a frame also have a vector including a bit for each destined output port for the frame. When an output port finishes transmitting a frame, the output queue passes the frame's pointers to multicast module 414, which clears the bit in the destination vector associated with that output port. When all of the bits in the destination vector have been cleared, the frame's pointers are returned to free module 404.

Figure 6:
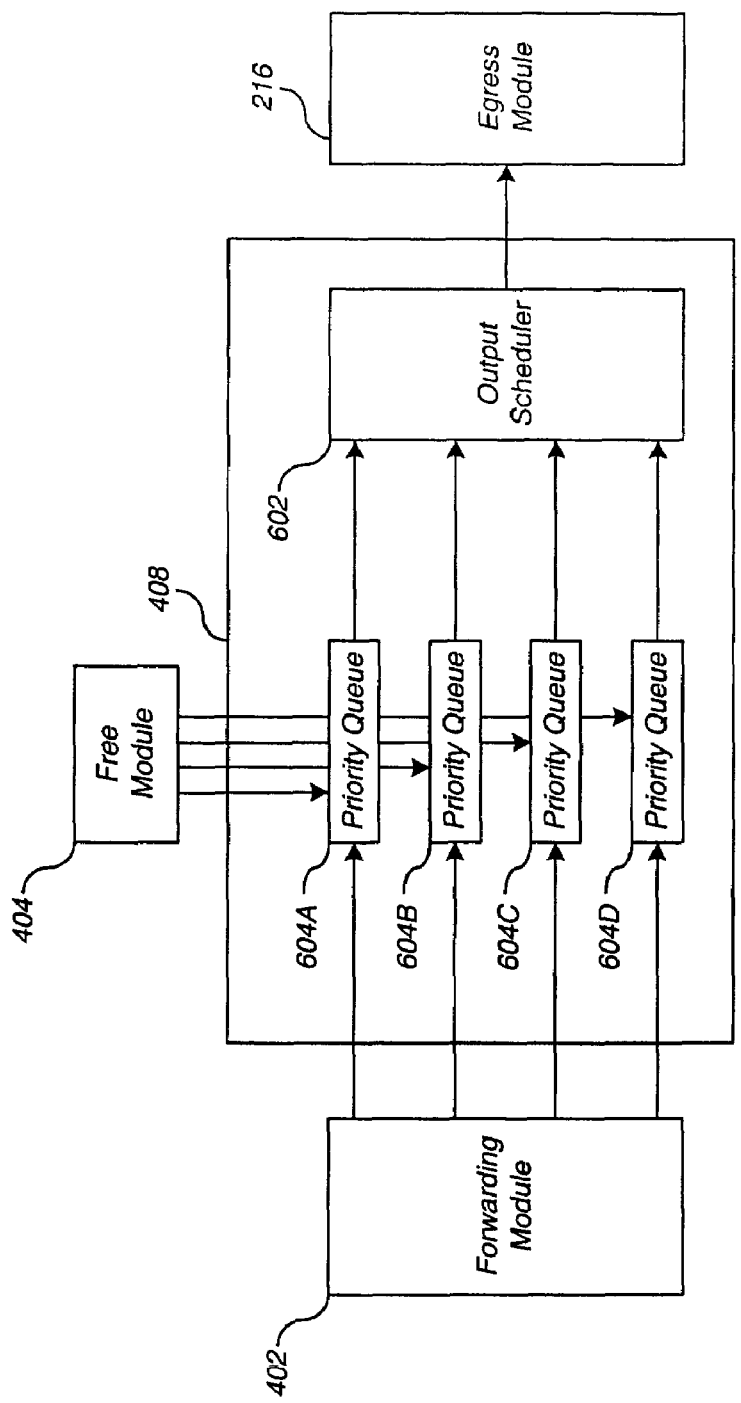
FIG. 6 is a block diagram of an output queue according to one implementation.

FIG. 6 is a block diagram of an output queue 408 according to one implementation. Output queue 408 includes an output scheduler 602 and four priority queues 604A, 604B, 604C, and 604D assigned to classes of service 3, 2, 1, and 0, respectively. Forwarding module 402 enqueues the pointers for each frame to a priority queue selected according to the class of service of the frame. For example, the pointers for a frame having class of service 2 are enqueued to priority queue 604B. Each egress module 216 can transmit only one frame at a time. Therefore output scheduler 602 selects one of the priority queues at a time based on a priority scheme that can be predetermined or selected by a user of the switch, such as a network administrator.

One priority scheme is strict priority. According to strict priority, higher-priority frames are always handled before lower-priority frames. Under this scheme, priority queue 604A transmits until it empties. Then priority queue 604B transmits until it empties, and so on.

Another priority scheme is weighted fair queuing. According to weighted fair queuing, frames are processed so that over time, higher-priority frames are transmitted more often than lower-priority frames according to a predetermined weighting scheme and sequence. One weighting scheme for four classes of service is "8-4-2-1." Of course, other weighting schemes can be used, as will be apparent to one skilled in the relevant art after reading this description.

According to 8-4-2-1 weighting, in 15 consecutive time units, 8 time units are allocated to class of service 3, 4 time units are allocated to class of service 2, 2 time units are allocated to class of service 1, and 1 time unit is allocated to class of service 0. In one implementation, the sequence shown in Table 1 is used with 8-4-2-1 weighting.

TABLE 1

| Time Unit | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Priority | 3 | 2 | 3 | 1 | 3 | 2 | 3 | 0 | 3 | 2 | 3 | 1 | 3 | 2 | 3 |

Thus when none of the priority queues are empty, the sequence of classes of service selected by output scheduler 602 is 3-2-3-1-3-2-3-0-3-2-3-1-3-2-3. When one of the priority queues is empty, its slots in the sequence are skipped. For example, if only priority queue 604A is empty, the sequence of classes of service selected by output scheduler 602 is 2-1-2-0-2-1-2.

Figure 7A:
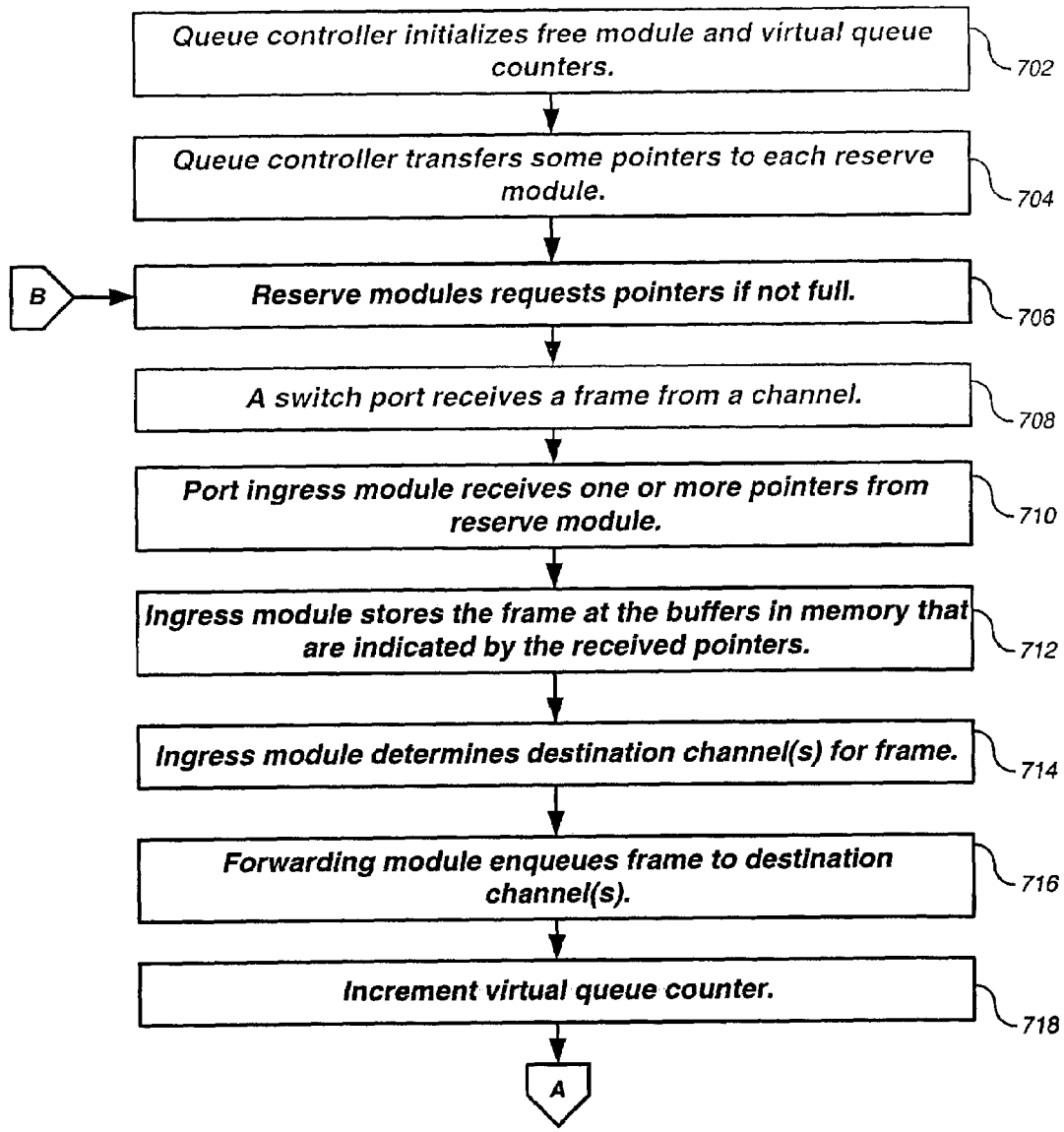
FIGS. 7A and 7B show a flowchart of a process of a network switch such as the switch of FIG. 2 under control of the queue controller of FIG. 4 according to one implementation.
Figure 7B:
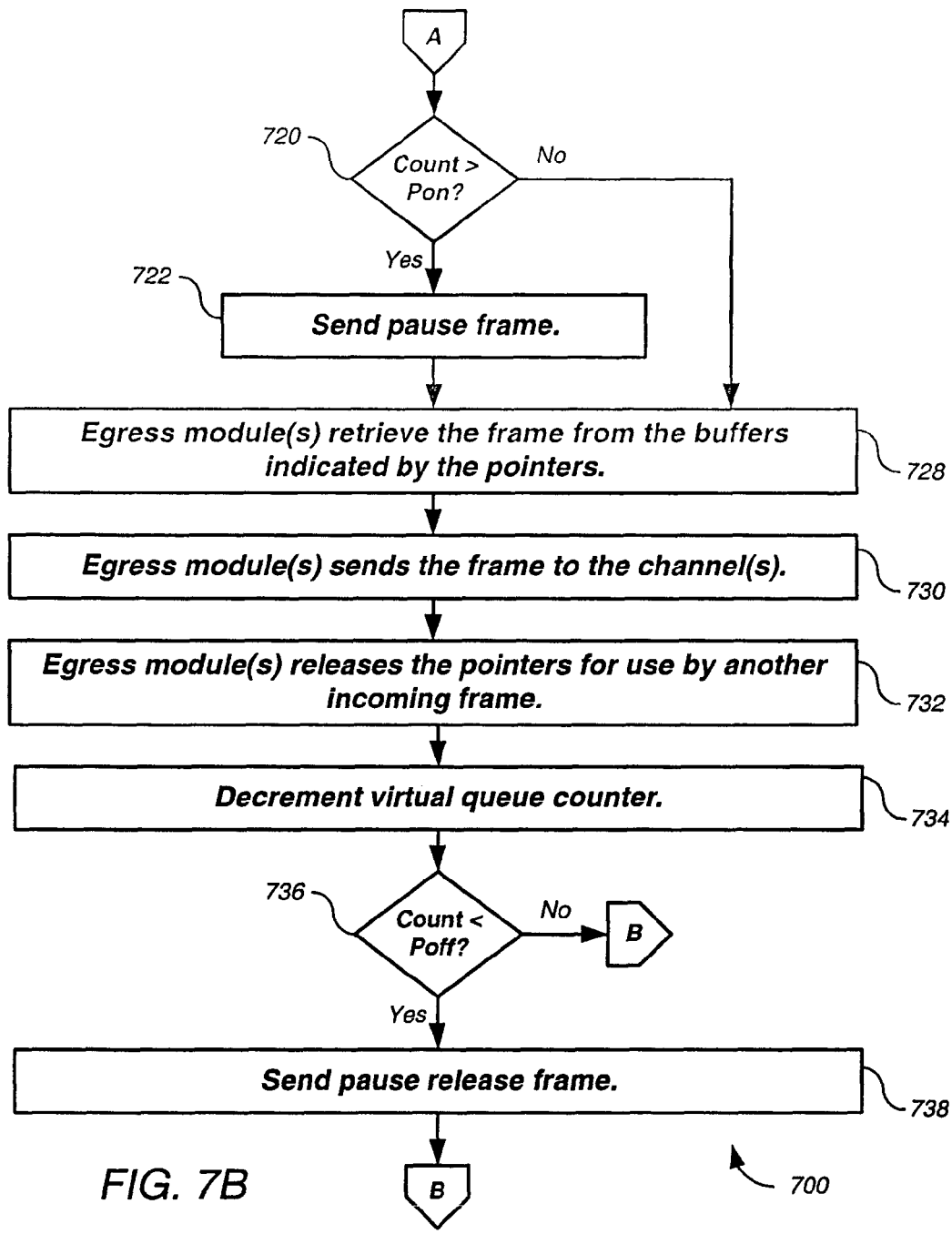

FIGS. 7A and 7B show a flowchart of a process 700 of a network switch such as switch 200 under control of queue controller 400 according to one implementation. At power-on of switch 200, queue controller 400 initializes a free module 404 to contain a number of pointers to unused buffers in memory 208, and initializes virtual queue counters 416 to zero (step 702). Queue controller 400 transfers some of these pointers to each reserve module 406 (step 704).

Each reserve module 406 includes a counter to count the number of pointers in the reserve module. When the number of pointers is below the capacity of the reserve module 406, the reserve module continually requests pointers from free module 404 (step 706). In some implementations, the capacity of each reserve module 406 is 4 pointers, where a frame of maximum size requires 3 pointers.

A port 202 of switch 200 receives a frame from a channel 204 (step 708). The frame enters the port 202 connected to the channel 204 and traverses the PHY 210 and MAC 212 of the port 202 to reach the ingress module 214 of the port 202. Ingress module 214 receives one or more pointers from the reserve module 406 for the port 202 (step 710). A frame data memory controller within ingress module 214 stores the frame in memory 208 at the buffers that are indicated by the received pointers (step 712). Ingress module 214 then determines the destination channel (or channels in the case of a multicast operation) to which the frame should be sent, according to methods well-known in the relevant arts (step 714).

Forwarding module 402 then enqueues the buffers for the frame to the destination channels of the frame (step 716). Forwarding module 402 enqueues the buffers by sending the pointers for the buffers to the output queues 408 for the ports connected to the destination channels.

The virtual queue counter 416 associated with the ingress module 214 storing the frame in the buffers increments once for each buffer enqueued for data received by that ingress module, preferably after each buffer is enqueued in order to maintain an accurate count. In some embodiments, virtual queue counter 416 increments when the corresponding reserve module sends a pointer to forwarding module 402. In other embodiments, virtual queue counter 416 increments only after forwarding module 402 has sent the pointer to all of its destination output queues 408. When the count of any virtual queue counter 416 exceeds a "pause" threshold Pon (step 720), the corresponding egress module 216 exercises flow control on the corresponding channel (step 722).

In some embodiments, the pause threshold for each virtual input queue counter 416 is offset by the number of buffers reserved by the corresponding reserve module 406 such that the corresponding egress module 216 exercises flow control on a channel when the count of the corresponding virtual queue counter 416 exceeds the pause threshold less the number of buffers reserved by the corresponding reserve module 406.

In some embodiments, a dynamic pause threshold is used, for example based on the number of pointers in free module 404. For example, the dynamic pause threshold Pondyn could be determined by $$Pondyn = Kon \times FreeSize \pm Offset \qquad (1)$$

where Kon and Offset are constants and FreeSize is the number of pointers in free module 404.

In an implementation where a port 202 is connected to a full-duplex channel, the port 204 exercises flow control on the channel by sending a "pause" frame to the channel, and releases flow control by sending a "pause release" frame to the channel, in accordance with the IEEE 802.3 standard. In an implementation where a port 202 is connected to a half-duplex channel, the port 204 exercises and terminates flow control on the channel by other well-known methods such as forced collisions or earlier carrier sense assertion.

When the pointers for the frame reach the head of an output queue 408 of a port 202, the egress module 216 of the port retrieves the frame from the buffers indicated by the pointers (step 728) and sends the frame to its channel 204 (step 730). The output queue 408 then releases the pointers by returning them to free module 404 (step 732).

The virtual queue counter 416 associated with the ingress module 214 that originally received the frame just transmitted decrements once for each buffer of data transmitted for the frame (step 734), preferably as each buffer is freed in order to maintain an accurate count. When the count of any virtual queue counter 416 falls below a "pause release" threshold Poff (step 736), the corresponding egress module 216 terminates flow control on the corresponding channel (step 738).

In some embodiments, the pause release threshold for each virtual input queue counter 416 is offset by the number of buffers reserved by the corresponding reserve module 406 such that the corresponding egress module 216 terminates flow control on a channel when the count of the corresponding virtual queue counter 416 falls below the pause release threshold less the number of buffers reserved by the corresponding reserve module 406.

In some embodiments, a dynamic pause threshold is used, for example based on the number of pointers in free module 404. For example, the dynamic pause threshold Poffdyn could be determined by $$Poffdyn = Koff \times FreeSize \pm Offset \qquad (2)$$

where Koff and Offset are constants and FreeSize is the number of pointers in free module 404. Process 700 then resumes at step 706.

Any combination of static and dynamic thresholds, whether offset by the number of buffers reserved by the reserve module or not, can be used for exercising or terminating flow control on a channel.

A virtual input queue counter 416 is decremented in the following manner. When a reserve module 406 forwards a pointer to an output queue 408, it writes a source port identifier (SPID) and a destination port vector (DPV) to a header field of the pointer. The DPV is preferably an n-bit vector having a bit for each port 202 of switch 102. Each bit set to one in the DPV indicates a corresponding port 202 as a destination for the data stored in the buffer identified by the pointer.

As described above, each output queue releases a pointer after transmitting the data in the buffer identified by the pointer. When a pointer is released by an output queue 408, multicast module 414 sets the bit for that output queue in the DPV for the released pointer to zero. When a DPV becomes all-zero, indicating that the corresponding data has been transmitted to all of its destination channels, multicast module 414 causes the virtual queue counter 416 in the port 202 identified by the SPID for the pointer to decrement.

By maintaining virtual input queues (in the form of virtual input queue counters 416), embodiments of the present invention achieve the accurate and rapid flow control of an input-queued switch in a high-performance output-queued switch.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Please list any additional modifications or variations. Accordingly, other implementations are within the scope of the following claims.

What is claimed is:

1. A network switching device for transferring data among n channels, the network switching device comprising:
   n receive circuits each adapted to receive frames of the data from a respective one of the n channels,
   n ingress modules each comprising
      a frame data memory controller circuit adapted to store the data of each frame in one or more buffers, wherein each of the buffers is adapted to store a plurality of bytes of the data, and
      a destination resolution circuit adapted to select one or more of the n channels as destination channels for each of the frames;
   a forwarding module adapted to enqueue each buffer storing the data of the frames to the respective one or more destination channels;
   n egress modules each adapted to transmit, to a respective one of the n channels, the data in the buffers enqueued to the respective one of the n channels; and
   n counters each adapted to store a count for a respective one of the n channels, to selectively increment the count based on when the forwarding module enqueues a buffer to one or more destination channels, and to decrement the count after the data stored in a buffer enqueued by the forwarding module is transmitted to one or more of the n channels to which the buffer was enqueued;
   wherein each of the n egress modules is further adapted to exercise flow control on a respective one of the n channels when a respective count is greater than a pause threshold.

2. The network switching device of claim 1:
   wherein, to exercise flow control, each of the n egress modules is further adapted to transmit a pause frame to a respective one of the n channels.

3. The network switching device of claim 2:
   wherein each of the n egress modules is further adapted to terminate flow control on a respective one of the n channels when the respective count is less than a pause release threshold.

4. The network switching device of claim 3:
   wherein, to terminate flow control, each of the n egress modules is further adapted to transmit a pause release frame to a respective one of the n channels.

5. The network switching device of claim 3, further comprising:
   n reserve modules each adapted to reserve one or more of the buffers to each of the n channels;
   wherein the pause release threshold for each of the n channels is a function of at least one of the group consisting of
      the number of the buffers reserved to the channel; and
      the number of the buffers neither reserved nor enqueued to any of the n channels.

6. The network switching device of claim 2:
   wherein, to decrement the count, each of the n counters is further adapted to decrement the count after the data stored in a buffer enqueued from the respective one of the n ingress modules is transmitted to all of the n channels to which the buffer was enqueued.

7. The network switching device of claim 1, further comprising:
   n output queues each associated with one of the n channels and adapted to store pointers for one or more of the buffers; and
   wherein, to enqueue one of the buffers to one of the destination channels, the forwarding module is further adapted to send, to the one of the n output queues associated with the one of the destination channels, a pointer for the one of the buffers.

8. The network switching device of claim 1, further comprising:
   n reserve modules each adapted to reserve one or more of the buffers to each of the n channels;
   wherein the pause threshold for each of the n channels is a function of at least one of the group consisting of
      the number of the buffers reserved to the channel; and
      the number of the buffers neither reserved nor enqueued to any of the n channels.

9. An integrated circuit comprising the network switching device of claim 1.

10. A network switch comprising the network switching device of claim 1.

11. The network switching device of claim 1, further comprising:
   a memory comprising the buffers.

12. An integrated circuit comprising the network switching device of claim 11.

13. The network switching device of claim 1 comprising a reserve module that receives a pointer associated with an available buffer of a shared memory based on a received frame, wherein said forwarding module that sends said pointer to a destination output queue, and wherein said respective count is incremented when said pointer is sent to said destination output queue.

14. The network switching device of claim 1 wherein said pause threshold is based on a number of available pointers.

15. The network switching device of claim 14 wherein said available pointers refer to memory addresses.

16. The network switching device of claim 1 wherein said pause threshold is based on a number of pointers in a free module.

17. The network switching device of claim 1 wherein said pause threshold is based on a first constant summed with a product of a second constant and a number of available pointers.

18. The network switching device of claim 1 wherein said n counters selectively increment said count after enqueueing of a buffer to a destination channel.

19. The network switching device of claim 1 wherein said n receive circuits receive a portion of a frame, and wherein said n counters selectively increment said count after a buffer is enqueued to a destination channel based on reception of said portion and before reception of a remaining portion of said frame.

20. The network switching device of claim 1 wherein said n counters selectively decrement said count after a portion of a frame of data in a first buffer is transmitted and before a remaining portion of said frame in a second buffer is transmitted.

21. The network switching device of claim 1 wherein said n counters selectively increment said count based on when a pointer is sent to an output queue.

22. The network switching device of claim 1 wherein said n counters selectively increment said count after reception of said frames and after a pointer is sent to an output queue.

23. The network switching device of claim 1 wherein said n counters selectively increment said count after a pointer is sent to corresponding output queues destined for said pointer.

24. The network switching device of claim 1 wherein said n counters selectively increment said count independent of reception of said frames.

25. The network switching device of claim 1 wherein said n counters selectively increment said count by an integer value greater than one (1) per reception of a frame.

26. The network switching device of claim 1 wherein said forwarding module enqueues a plurality of buffers based on storage of a frame, and wherein said n counters selectively increment said count by an integer value greater than one (1) based on said enqueueing of said plurality of buffers.

27. A network switching device for transferring data among n channels, the network switching device comprising:

n receive circuit means for receiving frames of the data from a respective one of the n channels, n ingress module means for handling the frames of the data, wherein each of the n ingress module means comprises frame data memory controller circuit means for storing the data of each frame in one or more buffers, wherein each of the buffers is adapted to store a plurality of bytes of the data, and destination resolution circuit means for selecting one or more of the n channels as destination channels for each of the frames;

forwarding module means for enqueueing each buffer storing the data of the frames to the respective one or more destination channels;

n egress module means each for transmitting, to a respective one of the n channels, the data in the buffers enqueued to the respective one of the n channels; and n counter means each for storing a count for a respective one of the n channels, selectively incrementing the count based on when the forwarding module means enqueues a buffer to one or more destination channels, and decrementing the count after the data stored in a buffer enqueued by the forwarding module means is transmitted to one or more of the n channels to which the buffer was enqueued;

wherein each of the n egress module means exercises flow control on a respective one of the n channels when a respective count is greater than a pause threshold.

28. The network switching device of claim 27:

wherein, to exercise flow control, each of the n egress module means transmits a pause frame to a respective one of the n channels.

29. The network switching device of claim 28:

wherein each of the n egress module means terminates flow control on a respective one of the n channels when the respective count is less than a pause release threshold.

30. The network switching device of claim 29:

wherein, to terminate flow control, each of the n egress module means transmits a pause release frame to a respective one of the n channels.

31. The network switching device of claim 29, further comprising:

n reserve module means for reserving one or more of the buffers to each of the n channels;

wherein the pause release threshold for each of the n channels is a function of at least one of the group consisting of the number of the buffers reserved to the channel; and the number of the buffers neither reserved nor enqueued to any of the n channels.

32. The network switching device of claim 28:

wherein; to decrement the count, each of the n counter means decrements the count after the data stored in a buffer enqueued from the respective one of the n ingress module means is transmitted to all of the n channels to which the buffer was enqueued.

33. The network switching device of claim 27, further comprising:

n output queue means each associated with one of the n channels and for storing pointers for one or more of the buffers; and wherein, to enqueue one of the buffers to one of the destination channels, the forwarding module means sends, to the one of the n output queue means associated with the one of the destination channels, a pointer for the one of the buffers.

34. The network switching device of claim 27, further comprising:

n reserve module means for reserving one or more of the buffers to each of the n channels;

wherein the pause threshold for each of the n channels is a function of at least one of the group consisting of the number of the buffers reserved to the channel; and the number of the buffers neither reserved nor enqueued to any of the n channels.

35. An integrated circuit comprising the network switching device of claim 27.

36. A network switch comprising the network switching device of claim 27.

37. A method for transferring data among n channels, the method comprising:

receiving frames of the data from the n channels,
storing the data of each frame in one or more buffers,
selecting one or more of the n channels as destination channels for each of the frames, and
enqueueing each buffer storing the data of the frames to the respective one or more destination channels;
transmitting, to each of the n channels, the data stored in the buffers enqueued to the respective one of the n channels;
storing a count for each of the n channels;
selectively incrementing the count for one of the n channels based on when enqueueing a buffer storing data for a frame received by the one of the n channels;
decrementing the count for one of the n channels after the data stored in one of the buffers for one of the frames received from the one of the n channels is transmitted to one or more of the n channels to which the one of the buffers was enqueued;
exercising flow control on one of the n channels when a respective count is greater than a pause threshold.

38. The method of claim 37, wherein exercising flow control on a respective one of the n channels comprises:
transmitting a pause frame to the respective one of the n channels.

39. The method of claim 38, further comprising:
terminating flow control on one of the n channels when a respective count is less than a pause release threshold.

40. The method of claim 39, wherein terminating flow control on a respective one of the n channels comprises:
transmitting a pause release frame to the respective one of the n channels.

41. The method of claim 39, further comprising:
reserving one or more of the buffers to each of the n channels;
wherein the pause release threshold for each of the n channels is a function of at least one of the group consisting of
the number of the buffers reserved to the channel; and
the number of the buffers neither reserved nor enqueued to any of the n channels.

42. The method of claim 38, wherein decrementing the count for one of the n channels comprises:
decrementing the count after the data stored in the one of the buffers for the one of the frames is transmitted to all of the n channels to which the one of the buffers was enqueued.

43. The method of claim 37, wherein enqueuing one of the buffers to one of the destination channels comprises sending a pointer for the one of the buffers to an output queue associated with the one of the destination channels.

44. The method of claim 37, further comprising:
reserving one or more of the buffers to each of the n channels;
wherein the pause threshold for each of the n channels is a function of at least one of the group consisting of
the number of the buffers reserved to the channel; and
the number of the buffers neither reserved nor enqueued to any of the n channels.

45. A computer readable storage medium storing a computer program that includes instructions executable by a processor to control an apparatus for transferring data among n channels, the instructions comprising:
storing the data of each frame received from the n channels in one or more buffers;
selecting one or more of the n channels as destination channels for each of the frames;
enqueueing each buffer storing the data of the frames to the respective one or more destination channels;
causing the apparatus to transmit, to each of the n channels, the data stored in the buffers enqueued to the respective one of the n channels;
storing a count for each of the n channels;
selectively incrementing the count for one of the n channels based on when enqueueing a buffer storing data for a frame received by the one of the n channels;
decrementing the count for one of the n channels after the data stored in one of the buffers for one of the frames received from the one of the n channels is transmitted to one or more of the n channels to which the one of the buffers was enqueued;
causing the apparatus to exercise flow control on one of the n channels when a respective count is greater than a pause threshold.

46. The computer readable storage medium of claim 45, wherein causing the apparatus to exercise flow control on a respective one of the n channels comprises:
causing the apparatus to transmit a pause frame to the respective one of the n channels.

47. The computer readable storage medium of claim 46, wherein the instructions further comprise:
causing the apparatus to terminate flow control on one of the n channels when a respective count is less than a pause release threshold.

48. The computer readable storage medium of claim 47, wherein causing the apparatus to terminate flow control on a respective one of the n channels comprises:
causing the apparatus to transmit a pause release frame to the respective one of the n channels.

49. The computer readable storage medium of claim 47, wherein the instructions further comprise:
reserving one or more of the buffers to each of the n channels;
wherein the pause release threshold for each of the n channels is a function of at least one of the group consisting of
the number of the buffers reserved to the channel; and
the number of the buffers neither reserved nor enqueued to any of the n channels.

50. The computer readable storage medium of claim 46, wherein decrementing the count for one of the n channels comprises:
decrementing the count by after the data stored in the one of the buffers for the one of the frames is transmitted to all of the n channels to which the one of the buffers was enqueued.

51. The computer readable storage medium of claim 45, wherein enqueuing one of the buffers to one of the destination channels comprises sending a pointer for the one of the buffers to an output queue associated with the one of the destination channels.

52. The computer readable storage medium of claim 45, wherein the instructions further comprise:
reserving one or more of the buffers to each of the n channels;
wherein the pause threshold for each of the n channels is a function of at least one of the group consisting of
the number of the buffers reserved to the channel; and
the number of the buffers neither reserved nor enqueued to any of the n channels.

* * * * *